(12) United States Patent
Kuwano (10) Patent No.: US 10,214,056 B2
(45) Date of Patent: Feb. 26, 2019

(54) PNEUMATIC TIRE

(71) Applicant: Toyo Tire & Rubber Co., Ltd., Osaka-shi, Osaka (JP)

(72) Inventor: Shingo Kuwano, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 134 days.

(21) Appl. No.: 15/347,004

(22) Filed: Nov. 9, 2016

(65) Prior Publication Data

US 2017/0136830 A1  May 18, 2017

(30) Foreign Application Priority Data

Nov. 16, 2015 (JP) .................. 2015-224192

(51) Int. Cl.
*B60C 11/13* (2006.01)
*B60C 11/11* (2006.01)
*B60C 11/12* (2006.01)

(52) U.S. Cl.
CPC .......... *B60C 11/1353* (2013.01); *B60C 11/11* (2013.01); *B60C 11/1204* (2013.01); *B60C 11/1236* (2013.01); *B60C 11/1307* (2013.01); *B60C 2011/1213* (2013.01); *B60C 2011/1361* (2013.01)

(58) Field of Classification Search
CPC ..... B60C 11/11; B60C 11/12; B60C 11/1236; B60C 11/13; B60C 11/1307; B60C 11/1315; B60C 11/1353; B60C 11/1369; B60C 2011/1338; B60C 2011/1361
USPC ............ 152/209.18, 209.19, 209.21, 209.22
See application file for complete search history.

(56) References Cited

U.S. PATENT DOCUMENTS

| | | | |
|---|---|---|---|
| 2011/0203709 A1* | 8/2011 | Behr | B60C 11/0302 152/209.24 |
| 2011/0277897 A1 | 11/2011 | Yokomakura | |
| 2017/0120691 A1* | 5/2017 | Arai | B60C 11/1392 |
| 2017/0326919 A1* | 11/2017 | Heinhaupt | B60C 11/1307 |

FOREIGN PATENT DOCUMENTS

| | | |
|---|---|---|
| JP | 2002-46422 A | 2/2002 |
| JP | 2003-154812 A | 5/2003 |
| JP | 2011-240784 A | 12/2011 |

* cited by examiner

*Primary Examiner* — Eric Hug
(74) *Attorney, Agent, or Firm* — Westerman, Hattori, Daniels & Adrian, LLP (57) ABSTRACT

A pneumatic tire according to an embodiment includes blocks formed by a main groove and a lateral groove on a tread portion. At least one block includes at least two sipes which divide the block into three or more sections in the tire circumferential direction. A pair of reinforcing projections which projects in the main groove is formed on both end portions of the block in the tire circumferential direction ranging from a side wall of the block to a groove bottom of the main groove. A connecting rib which connects distal end portions of the pair of reinforcing projections to each other is formed on the groove bottom of the main groove.

16 Claims, 4 Drawing Sheets

PNEUMATIC TIRE

CROSS-REFERENCE TO RELATED APPLICATIONS

This application is based upon and claims the benefit of priority from the prior Japanese Patent Application No. 2015-224192, filed on Nov. 16, 2015; the entire contents of which are incorporated herein by reference.

BACKGROUND

1. Technical Field

This embodiment relates to a pneumatic tire.

2. Related Art

With respect to a pneumatic tire, there has been known a pneumatic tire where a tread portion includes blocks formed by main grooves extending in a tire circumferential direction and lateral grooves extending in a tire width direction. Particularly in a tire having a large main groove width such as a light-track-use tire, contact patch compression is liable to occur. In addition to such a drawback, in the tire having such blocks, the displacement (movement) of a corner portion of the block is large. Accordingly, the block falls down in a width direction and a circumferential direction of the block, and this falling becomes a factor of causing uneven wear. Particularly, when a plurality of sipes which extend in a tire width direction are formed in the block for increasing a traction performance in all seasons, lowering of rigidity of a corner portion of the block is large and hence, uneven wear is liable to occur.

To suppress contact patch compression by increasing rigidity of a main groove portion, JP-A-2003-154812 discloses a technique where a reinforcing projection projecting in a main groove is formed on a side wall of a block which faces the main groove over a range from the side wall to a groove bottom. This publication also discloses a technique where a plurality of sipes extending in a tire width direction are formed on the block. However, when the reinforcing projection is simply formed on the side wall of the block, particularly in the tire where the block is divided into a plurality of sections by the sipes, the movement of the section positioned at the corner portion of the block cannot be sufficiently suppressed.

On the other hand, JP-A-2002-046422 discloses a technique where, to suppress the reduction of a ground contact area during run flat traveling, a platform is formed in a main groove which defines a block, and the platform is formed of a pair of projecting portions which opposedly faces each other with a gap of a fixed width therebetween. However, the pair of projecting portions is provided for suppressing concave curved deformation of a tread portion by being brought into contact with each other by collapse of a gap therebetween during run flat traveling. Accordingly, this publication discloses neither a technique of projecting a reinforcing projection from side walls of both end portions of a block in a tire circumferential direction nor a technique of connecting the reinforcing projections by a rib extending in the tire circumferential direction.

JP-A-2011-240784 discloses a technique where, to suppress deformation of a main groove, a projecting portion and a cut portion which opens on a groove wall surface are alternately formed on at least one groove wall surface of the main groove along a tire circumferential direction. However, the projecting portion does not extend to a groove bottom and hence, an effect of suppressing falling of a land portion is insufficient.

SUMMARY

It is an object of this embodiment to provide a pneumatic tire having a block that is divided into a plurality of sections in a tire circumferential direction, wherein uneven wear can be suppressed by suppressing the movement of a corner portion of the block.

The pneumatic tire according to this embodiment includes a tread portion which includes blocks formed by a main groove extending in a tire circumferential direction and a lateral groove extending in a direction which intersects with the main groove. At least one block includes at least two sipes which divide the block into three or more sections in the tire circumferential direction. A pair of reinforcing projections which projects in the main groove is formed on both end portions of the block in the tire circumferential direction ranging from a side wall of the block to a groove bottom of the main groove. Further, a connecting rib which connects distal end portions of the pair of reinforcing projections to each other is formed on the groove bottom of the main groove.

DESCRIPTION OF THE EMBODIMENTS

According to a pneumatic tire of this embodiment, falling of a block toward the inside of a main groove can be suppressed by a pair of reinforcing projections. Further, a connecting rib suppresses the movement in a tire circumferential direction of a section positioned at both ends of the block in the tire circumferential direction. Accordingly, the movement of block corner portions can be effectively suppressed thus suppressing uneven wear of the block.

Hereinafter, the pneumatic tire according to the embodiment is explained with reference to drawings.

Although not shown in the drawings, a pneumatic tire according to this embodiment is formed of: a pair of left and right bead portions; a pair of left and right side wall portions; and a tread portion 10 which is disposed between both left and right side wall portions so as to connect radially outer end portions of the left and right side wall portions to each other. The pneumatic tire can adopt the general-use tire structure with respect to constitutional elements thereof except for a tread pattern.

Figure 1:
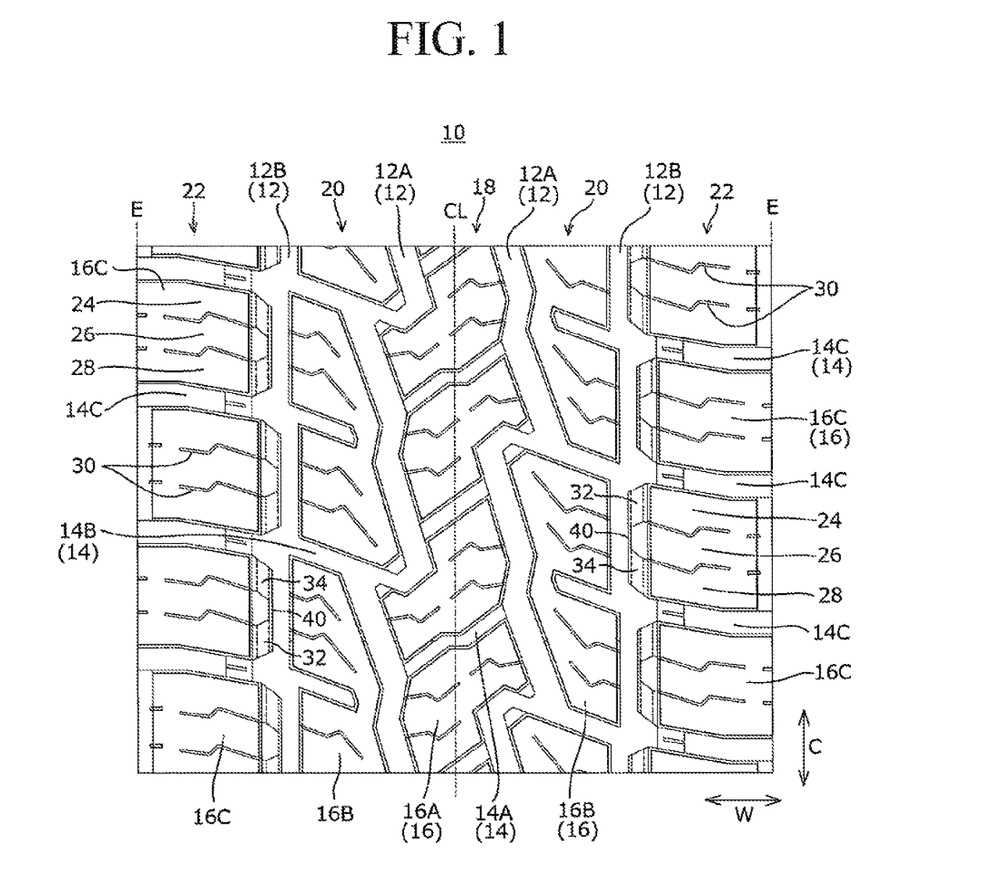
FIG. 1 is a developed view showing a tread pattern of a pneumatic tire according to one embodiment.

As shown in FIG. 1, on a surface of the tread portion 10, blocks 16 formed by a main groove 12 which extend in a tire circumferential direction C and a lateral groove 14 which extend in a tire width direction W are provided. In this embodiment, a plurality of main grooves 12 extending in the tire circumferential direction C are formed on the tread portion 10. To be more specific, four main grooves 12 consisting of center main grooves 12A, 12A which form a pair and are disposed on both sides of a tire equator CL respectively, and shoulder main grooves 12B, 12B which form a pair and are disposed outside in the tire width direction of the pair of center main grooves 12A, 12A respectively are formed on the tread portion 10. While the shoulder main grooves 12B extend substantially linearly in the tire circumferential direction C, the center main grooves 12A extend in the tire circumferential direction C in a winding manner including a zigzag manner. That is, provided that each of the main grooves 12A, 12B is formed of a groove extending in the tire circumferential direction C, it is not always necessary that the main grooves 12A, 12B are formed parallel to the tire circumferential direction C. Each of the main grooves 12A, 12B may be a groove extending in the tire circumferential direction C in an inclined manner. In the drawings, symbol CL indicates a tire equator, and symbol E indicates a tire ground-contact end.

On the tread portion 10, a plurality of land portions are formed in a divided manner by the main grooves 12. In this embodiment, the land portions formed on the tread portion 10 are constituted of a center land portion 18, a pair of left and right intermediate land portions 20, 20, and a pair of left and right shoulder land portions 22, 22. The center land portion 18 is formed between the pair of left and right center main grooves 12A, 12A. Each of the pair of left and right intermediate land portions 20, 20 is formed between the center main groove 12A and the shoulder main groove 12B. The pair of left and right shoulder land portions 22, 22 is formed outside the pair of left and right shoulder main grooves 12B, 12B in the tire width direction. That is, each of the pair of left and right shoulder land portions 22, 22 is formed between the shoulder main groove 12B and the ground-contact end E.

A plurality of lateral grooves 14A, 14B, 14C extending in the tire width direction W are formed on the respective land portions 18, 20, 22 at intervals in the tire circumferential direction C. With such a configuration, each of the respective land portions 18, 20, 22 is formed as a row of blocks where a plurality of blocks 16A, 16B, 16C formed by dividing by the lateral grooves 14A, 14B, 14C are arranged in the tire circumferential direction C. Accordingly, the tire of this embodiment is a tire having a block-based tread pattern.

The lateral grooves 14A, 14B, 14C are grooves extending in a direction which intersects with the main grooves 12A, 12B. It is not always necessary that the lateral grooves 14A, 14B, 14C are formed parallel to the tire width direction W provided that each of the lateral grooves 14A, 14B, 14C is formed of a groove extending in the tire width direction W. Each of the lateral grooves 14A, 14B, 14C may be formed of a groove extending in the tire width direction W in an inclined manner. Further, each of the lateral grooves 14A, 14B, 14C may be formed of a groove having a linear shape, a groove having a curved line shape or a groove having a bent portion.

The technical feature of this embodiment lies in the configuration of the shoulder blocks closest to the ground-contact end E, that is, the configuration of the blocks 16C of the shoulder land portion 22. Two sipes 30, 30 are formed on the block 16C. The sipes 30, 30 extend in the tire width direction W and divide the block 16C into three sections 24, 26, 28 in the tire circumferential direction C. In this embodiment, the sipe 30 is a cut formed on the block and has a fine groove width. A groove width of the sipe 30 is not particularly limited, and may be set to from 0.1 to 1.5 mm, from 0.2 to 1.0 mm, or from 0.3 to 0.8 mm, for example. In the same manner as the lateral grooves 14, it is not always necessary that the sipes 30 are formed parallel to the tire width direction W provided that each sipe 30 is formed of a narrow groove extending in the tire width direction W (that is, extending in a direction which intersects with the main grooves). The sipe 30 may be formed of a narrow groove extending in the tire width direction W in an inclined manner. The sipe 30 may also be formed into a linear shape or a curved line shape. The sipe 30 may also be a sipe having a bent portion or bent portions.

Figure 2:
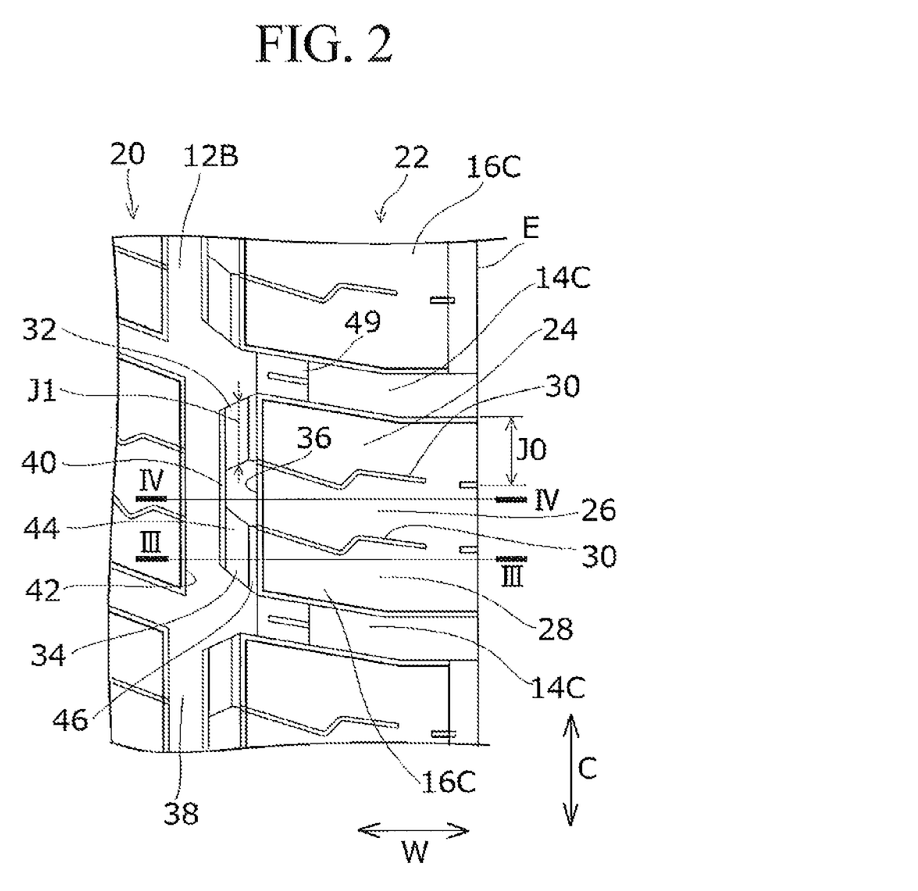
FIG. 2 is an enlarged plan view of a main part of the tread pattern.
Figure 3:
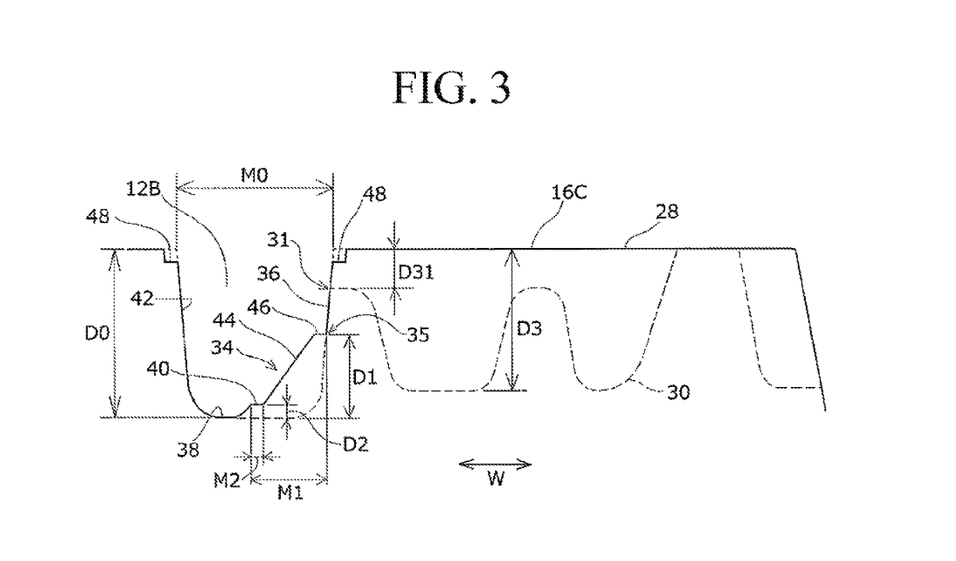
FIG. 3 is a cross-sectional view taken along a line III-III in FIG. 2.

Aiming at the uniform occurrence of wear on the respective sections 24, 26, 28, the sipes 30 are formed on the block 16C at equal intervals in the tire circumferential direction C so as to divide an area of a ground contact surface of the block 16C substantially equally (in this embodiment, three substantially equal areas). The sipes 30 may be formed such that the sipes 30 completely traverse the block 16C. However, as in the case of the illustrated example, it is not always necessary that the sipes 30 completely traverse the block 16C. As shown in FIG. 2 and FIG. 3, the sipes 30 are formed such that the sipes 30 open at the shoulder main groove 12B which defines the blocks 16C. A depth D3 of the sipe 30 is shallower than a depth D0 of the shoulder main groove 12B. In this embodiment, the depth D3 of the sipe 30 is not set to a fixed value in the extending direction of the sipe 30, and the sipe 30 has a shallow depth at an opening end portion thereof which opens to the shoulder main groove 12B. A depth D31 of the sipe 30 at the opening end portion may be set to 30% or below of the depth D0 of the shoulder main groove 12B.

A pair of reinforcing projections 32, 34 which projects in the shoulder main groove 12B is formed on both end portions of the block 16C in the tire circumferential direction C. The reinforcing projections 32, 34 project from both end portions in the tire circumferential direction C of a side wall 36 of the block 16C which faces the shoulder main groove 12B. As shown in FIG. 3, the reinforcing projections 32, 34 are formed in a region ranging from the side wall 36 to a groove bottom 38. That is, the reinforcing projections 32, 34 are projections extending along the groove bottom 38 of the main groove 12B from the side wall 36 of the block 16C (that is, a groove wall surface of the main groove 12B). As described above, the reinforcing projections 32, 34 are reinforcing portions mounted on a base portion of the block 16C so as to suppress the falling of the block 16C toward the shoulder main groove 12B so that the reinforcing projections 32, 34 suppress uneven wear of the block 16C.

Figure 4:
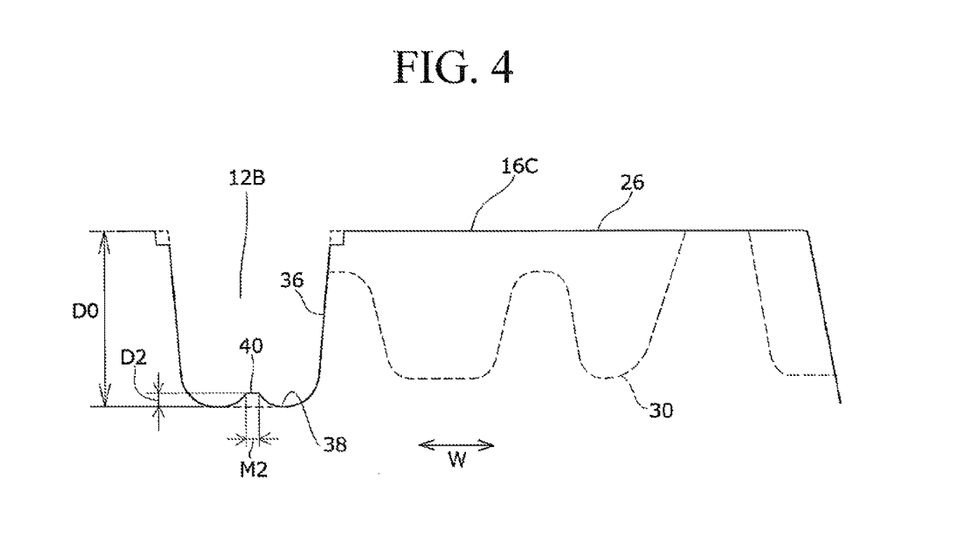
FIG. 4 is a cross-sectional view taken along a line IV-IV in FIG. 2.

As shown in FIG. 2 to FIG. 4, connecting ribs 40 are formed on the groove bottom 38 of the shoulder main groove 12B. Each connecting rib 40 connects distal end portions of the pair of reinforcing projections 32, 34 (that is, end portions of the reinforcing projections 32, 34 on a groove bottom 38 side) to each other. The connecting rib 40 is a ridge extending in the tire circumferential direction C along the extending direction of the main groove 12B, and connects the distal end portions of the pair of reinforcing projections 32, 34 to each other.

As shown in FIG. 2, the reinforcing projections 32, 34 are formed in a projecting manner from portions of the block 16C within the sections 24, 28 positioned at both ends of the block 16C in the tire circumferential direction C respectively. Accordingly, three sections 24, 26, 28 of the block 16C are formed of: the pair of sections 24, 28 which is positioned at both ends of the block 16C in the tire circumferential direction C and each of which is provided with the reinforcing projections 32, 34 on the side wall 36; and the section 26 which is positioned between the pair of sections 24, 28 and is not provided with the reinforcing projection on the side wall 36. In this embodiment, a width J1 in the tire circumferential direction C of the reinforcing projections 32, 34 is set equal to a width J0 in the tire circumferential direction C of the sections 24, 28 where the reinforcing projections 32, 34 are formed. The reinforcing projections 32, 34 extend to the groove bottom 38 from the side wall 36 with a fixed width J1.

The pair of reinforcing projections 32, 34 is formed in a projecting manner such that the reinforcing projections 32, 34 are inclined in directions that the reinforcing projections 32, 34 approach to each other as the reinforcing projections 32, 34 extend toward the inside of the shoulder main groove 12B from the side wall 36 so as to form a truncated chevron shape as viewed from above in a plan view shown in FIG. 2. With such a configuration, the respective reinforcing projections 32, 34 have a parallelogram shape as viewed in a plan view shown in FIG. 2, and the pair of reinforcing projections 32, 34 is arranged such that acute angle portions of the parallelograms of the respective reinforcing projections 32, 34 face each other in an opposed manner between the pair of reinforcing projections 32, 34. The reinforcing projections 32, 34 are connected to each other by the connecting rib 40 at acute angle portion sides of the respective reinforcing projections 32, 34.

The reinforcing projections 32, 34 have a cross-sectional shape shown in FIG. 3. The reinforcing projections 32, 34 starts from the side wall 36 of the block 16C, extends along the side wall 36 and the groove bottom 38, and terminates at a position which falls within a range of the groove bottom 38, before reaching a groove wall surface 42 of the shoulder main groove 12B which opposedly faces the side wall 36. Although FIG. 3 shows a cross-sectional shape of the reinforcing projection 34, the reinforcing projection 32 also has the same cross-sectional shape. In this embodiment, each of the reinforcing projections 32, 34 projects from the side wall 36 at a center portion of the shoulder main groove 12B having a depth D0, and terminates on the groove bottom 38 at a center portion of the shoulder main groove 12B having a groove width M0. That is, a projection height D1 (a projection height in a tire radial direction) of the reinforcing projections 32, 34 from the groove bottom 38 is set to from 35% to 65% of the depth D0 of the shoulder main groove 12B, and a projection width M1 (a projection width in the tire width direction) of the reinforcing projections 32, 34 from the side wall 36 is set to from 35% to 65% of the groove width M0 of the shoulder main groove 12B. By setting the projection width M1 and the projection height D1 of the reinforcing projections 32, 34 as described above, the reinforcing projections 32, 34 can enhance an effect of suppressing falling of the block 16C. Further, the groove width M0 and the depth D0 of the main groove 12B are set substantially equal to each other in general and hence, by setting the projection width M1 and the projection height D1 as described above, the projection width M1 of the reinforcing projections 32, 34 and the projection height D1 of the reinforcing projections 32, 34 become substantially equal to each other. Accordingly, the reinforcing projections 32, 34 exhibit an excellent rigidity balance. As shown in FIG. 3, an upper end 35 of the reinforcing projections 32, 34 on the side wall 36 is set at a position lower than a bottom 31 of the sipe 30 at an open end portion of the sipe 30.

Each of the reinforcing projections 32, 34 extends toward the groove bottom 38 from the side wall 36 of the block 16C along an inclined surface thus forming a triangular shape in cross section. That is, each of the reinforcing projections 32, 34 includes an inclined surface portion 44 where a projection height of the inclined surface portion 44 from the groove bottom 38 is decreased as the inclined surface portion 44 extends toward a distal end portion side of the inclined surface portion 44. In this embodiment, each of the reinforcing projections 32, 34 includes a terrace portion 46 having a platform shape between the side wall 36 and the inclined surface portion 44. That is, each of the reinforcing projections 32, 34 is formed such that an upper end of the inclined surface portion 44 is connected with the side wall 36 by way of the terrace portion 46, and a lower end of the inclined surface portion 44 is connected to the groove bottom 38 by way of the connecting rib 40.

To reinforce only the distal end portion of the reinforcing projections 32, 34, the connecting rib 40 is formed with a width M2 which falls within a range not exceeding 50% of the projection width M1 of the reinforcing projections 32, 34. As shown in FIG. 3 and FIG. 4, the connecting rib 40 is a low ridge having a height D2 which is formed on a center portion of the groove bottom 38, and the height D2 is set equal to a height of a lower end of the inclined surface portion 44. For example, the height D2 of the connecting rib 40 may be set to from 5% to 20% of the depth D0 of the shoulder main groove 12B. The connecting rib 40 is provided for connecting the pair of reinforcing projections 32, 34 of each block 16C to each other. Accordingly, the connecting rib 40 is provided for every block 16C in a separated manner, and is not continuously formed between the blocks 16C disposed adjacently to each other.

A ground contact edge 48 of each block 16C is formed into a stepped shape where the ground contact edge 48 is formed one stage lower than a surface of the block 16C. The depth D0 and the groove width M0 of the main groove 12 and the widths J0 of the respective sections 24, 26, 28 described previously are sizes of the shape of the main groove 12 and the block 16C having no such a stepped shape without taking into account such a stepped shape.

As shown in FIG. 2, in each lateral groove 14C which defines the blocks 16C, a reinforcing projection 49 is formed. The reinforcing projection 49 connects the blocks 16C, 16C disposed adjacently to each other in the tire circumferential direction C to each other at a groove bottom portion of the lateral groove 14C thus suppressing falling of the blocks 16C in the tire circumferential direction C.

According to this embodiment, the pneumatic tire can acquire the following manner of operation and advantageous effects. When the block 16C is divided into a plurality of sections 24, 26, 28 by the sipes 30 in the tire circumferential direction C, deformation at the sections 24, 28 on both ends in the tire circumferential direction C becomes large thus causing uneven wear. In this embodiment, the pair of reinforcing projections 32, 34 is provided to both end portions of the block 16C in the tire circumferential direction C and hence, it is possible to suppress falling of the sections 24, 28 at both ends of the reinforcing projections 32, 34 toward the shoulder main groove 12B. Further, the connecting rib 40 is provided to the reinforcing projections 32, 34, the movement of these sections 24, 28 in the tire circumferential direction C can be also suppressed. Accordingly, the movement of the corner portions of the block 16C can be suppressed and hence, uneven wear of the block 16C can be suppressed. Further, in this embodiment, both end portions of the block 16C in the tire circumferential direction C are reinforced by the reinforcing projections 32, 34, and a reinforcing projection is not formed on the center portion of the block 16C. As a result, the section 26 disposed at the center of the block 16C can be relatively flexibly moved so that the pneumatic tire of this embodiment can exhibit a traction effect brought about by the sipes 30. Accordingly, the pneumatic tire of this embodiment can achieve both the suppression of uneven wear and a traction effect simultaneously.

According to this embodiment, the reinforcing projections 32, 34 are provided only to the above-mentioned sections 24, 28 at both ends of the block 16C, and the reinforcing projection is not provided to the section 26 at the center of the block 16C between the sections 24, 28. Accordingly, the pneumatic tire of this embodiment can acquire, with more certainty, the manner of operation and an advantageous effect that the sections 24, 28 on both ends of the block 16C can be firmly fixed by the reinforcing projections 32, 34 and the section 26 at the center of the block 16C can be flexibly moved and hence, both the suppression of uneven wear and a traction effect can be enhanced. Accordingly, the pneumatic tire of this embodiment can easily acquire the all season performance which, for example, a light-track-use tire is required to possess.

Provided that the number of sections of the block 16C defined by the sipes 30 is three or more, the block 16C may be divided into four or five sections, for example. Further, three or more sections of the block may include a pair of sections which is positioned on both ends of the block in the tire circumferential direction and is provided with a reinforcing projection on a side wall, and sections which are positioned between the pair of sections and are not provided with a reinforcing projection on a side wall. In this case, with respect to the sections which are positioned between the pair of sections, provided that at least one section where a reinforcing projection is not provided is included, a section which is provided with a reinforcing projection may be included.

Figure 5:
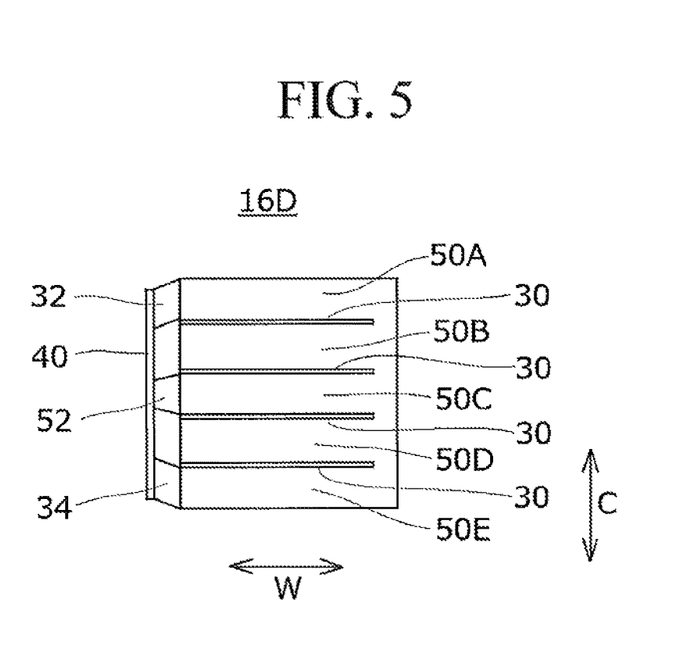
FIG. 5 is a plan view of a block according to another embodiment.

For example, FIG. 5 shows an example where a block 16D is divided into five sections 50A, 50B, 50C, 50D, 50E in the tire circumferential direction C by four sipes 30 extending in the tire width direction W. In this example, the section which is provided with a reinforcing projection and the section which is not provided with a reinforcing projection are alternately arranged. That is, reinforcing projections 32, 34, 52 are formed on a side wall 36 in the sections 50A. 50E on both ends of the block 16D in the tire circumferential direction C, and in the section 50C at the center of the block 16D in the tire circumferential direction C respectively. A reinforcing projection is not formed on the side wall 36 in the sections 50B, 50D which are sandwiched between the section 50A and the section 50C and between the section 50C and the section 50E respectively. Further, three reinforcing projections 32, 34, 52 are connected with each other by a connecting rib 40 extending in the tire circumferential direction C.

According to this embodiment, the pair of reinforcing projections 32, 34 is formed in a projecting manner such that the reinforcing projections 32, 34 are inclined in directions that the reinforcing projections 32, 34 approach to each other as the reinforcing projections 32, 34 extend toward the inside of the shoulder main groove 12B from the side wall 36 and hence, acute angle portion sides of the pair of reinforcing projections 32, 34 are connected to each other by the connecting rib 40. Accordingly, rigidity of the reinforcing projections 32, 34 can be effectively enhanced.

According to this embodiment, each of the reinforcing projections 32, 34 is configured to include an inclined surface portion 44 where a projection height of the reinforcing projections 32, 34 from the groove bottom 38 is decreased as the reinforcing projections 32, 34 extends toward a distal end portion side. Further, the terrace portion 46 is formed between the inclined surface portion 44 and the side wall 36 and hence, the occurrence of cracks on base portions of the reinforcing projections 32, 34 on a side wall 36 side can be suppressed.

In general, contact patch compression due to falling of the block is liable to occur at the shoulder land portion 22. Accordingly, it is preferable to apply the blocks to which the above-mentioned reinforcing projections 32, 34 are provided to the shoulder blocks 16C. However, the above-mentioned reinforcing projections 32, 34 may be applied to other blocks such as the block 16B positioned at the intermediate land portion 20. That is, the application of the block to which the reinforcing projections 32, 34 are provided is not limited to the shoulder block 16C. When the block to which the reinforcing projections 32, 34 are applied is the shoulder block 16C, since the main groove 12B is disposed on an inner side of the shoulder block 16C in the tire width direction, the reinforcing projections 32, 34 are formed on the side wall of the shoulder block 16C disposed on an inner side of the shoulder block 16C in the tire width direction. On the other hand, in the case of the blocks 16A, 16B at the center land portion 18 and at the intermediate land portion 20, the main grooves 12A, 12B are disposed on both sides of the blocks 16A, 16B in the tire width direction. Accordingly, the reinforcing projections 32, 34 may be formed only on a side wall of either one of the main grooves, or may be formed on side walls of both main grooves.

In the above-mentioned embodiment, the configuration is adopted where the above-mentioned reinforcing projections 32, 34 are provided to all blocks 16C of the shoulder land portion 22. However, it is not always necessary to provide the reinforcing projections 32, 34 to all blocks. Further, the number of main grooves 12 is not limited to four, and three or five main grooves 12 may be provided to the tread portion 10.

As the pneumatic tire according to this embodiment, tires for various types of vehicles such as a tire for passenger vehicle, a light-track-use tire for an SUV (sport utility vehicle), a pick-up track and the like, a heavy load tire for a track, bus and the like can be named, and the purpose of use of the pneumatic tire is not particularly limited and hence, the pneumatic tire according to this embodiment includes a summer tire, a winter tire, an all season tire and the like.

The above-mentioned respective sizes in this specification are sizes of the tire in a no-load normal state where a pneumatic tire is mounted on a normal rim and is inflated to a normal internal pressure. The normal rim means "standard rim" in JATMA standard, "design Rim" in TRA standard or "Measuring Rim" in ETRTO standard. The normal internal pressure means "highest air pressure" in the JATMA standard, "maximum value" described in "TIRE LOAD LIMITS AT VARIOUS COLD INFLATION PRESSURE" in the TRA standard, or "INFLATION PRESSURE" in the ETRTO standard.

Examples

To confirm the advantageous effects acquired by the above-mentioned embodiment, uneven wear resistance and a traction performance were evaluated with respect to the pneumatic tire of an example and a pneumatic tire of a comparison example (tire size: LT265/70R17). The tire of the example is a tire having technical features according to the embodiment shown in FIG. 1 to FIG. 4, wherein a depth D0 of a shoulder main groove 12 is set to 13.1 mm, a groove width M0 of the shoulder main groove 12 is set to 12.4 mm, a projection height D1 of reinforcing projections 32, 34 is set to 6.5 mm, a projection width M1 of the reinforcing projections 32, 34 is set to 6.5 mm, a height D2 of a connecting rib 40 is set to 1.0 mm, and a width M2 of the connecting rib 40 is set to 1.0 mm. The tire of the comparison example is an example of the tire according to the example where although the reinforcing projections 32, 34 are provided, the connecting rib 40 is not provided. Further, other configurations of the tire of the comparison example are set substantially equal to corresponding configurations of the tire according to the example.

These tires were respectively mounted on normal rims and were inflated to a normal internal pressure, and were mounted on a vehicle. Then, uneven wear resistance and a traction effect were evaluated. The method for evaluating uneven wear resistance and a traction performance was carried out as follows.

Uneven Wear Resistance:

After the vehicle traveled 12,000 km, an uneven wear ratio=(minimum wear amount/maximum wear amount) was calculated with respect to a wear amount on a step-in side and a wear amount on a step-out side of the shoulder land portion 22 with the lateral groove 14C sandwiched between both sides. The result of calculation is expressed as an index while setting an uneven wear ratio of the comparison example as 100. The larger a numerical value of the index, the more uniformly the block is worn.

Traction Performance:

The acceleration performance of the tire at the time of traveling on an icy and snowy road surface was expressed as an index while setting a value of the acceleration performance of the tire of the comparison example as 100. The larger a numerical value of the index, the more excellent the traction performance in all seasons is.

TABLE 1

|  | Comparison example | Example |
| --- | --- | --- |
| Reinforcing structure of shoulder block | Reinforcing projections but no connecting rib | Reinforcing projections and connecting rib |
| Uneven wear resistance | 100 | 103 |
| Traction performance | 100 | 100 |

The result of the evaluation is shown in Table 1. Compared to the comparison example where the reinforcing projections are not connected to each other by the connecting rib, in the example where the reinforcing projections are connected to each other by the connecting rib, the uneven wear resistance can be enhanced while maintaining the traction performance.

Although several embodiments have been explained heretofore, these embodiments have been proposed as examples and are not intended to restrict the scope of the present invention. These novel embodiments can be carried out in other various modes, and various omissions, replacements and changes can be made without departing from the gist of the present invention.

What is claimed is:

1. A pneumatic tire comprising: a tread portion which includes blocks formed by a main groove extending in a tire circumferential direction and a lateral groove extending in a direction which intersects with the main groove, wherein at least one block includes at least two sipes which divide the block into three or more sections in the tire circumferential direction, a pair of reinforcing projections which projects in the main groove is formed on both end portions of the block in the tire circumferential direction ranging from a side wall of the block to a groove bottom of the main groove, and a connecting rib which connects distal end portions of the pair of reinforcing projections to each other is formed on the groove bottom of the main groove, wherein the three or more sections of the block include a pair of sections which is positioned at both ends of the block in the tire circumferential direction and each of which is provided with the reinforcing projection on the side wall, and a section which is positioned between the pair of sections and is not provided with the reinforcing projection on the side wall.

2. The pneumatic tire according to claim 1, wherein each reinforcing projection includes an inclined surface portion where a projection height of the reinforcing projection from the groove bottom is decreased as the reinforcing projection extends toward a distal end portion side.

3. The pneumatic tire according to claim 2, wherein each reinforcing projection includes a terrace portion between the side wall and the inclined surface portion.

4. The pneumatic tire according to claim 2, wherein the projecting height of each reinforcing projection from the groove bottom is from 35% to 65% of a depth of the main groove, and a projection width of each reinforcing projection from the side wall is from 35% to 65% of a groove width of the main groove.

5. The pneumatic tire according to claim 4, wherein the connecting rib has a width within a range not exceeding 50% of the projection width of the reinforcing projections.

6. The pneumatic tire according to claim 1, wherein the block on which the reinforcing projections are provided is a shoulder block.

7. A pneumatic tire comprising: a tread portion which includes blocks formed by a main groove extending in a tire circumferential direction and a lateral groove extending in a direction which intersects with the main groove, wherein at least one block includes at least two sipes which divide the block into three or more sections in the tire circumferential direction, a pair of reinforcing projections which projects in the main groove is formed on both end portions of the block in the tire circumferential direction ranging from a side wall of the block to a groove bottom of the main groove, and a connecting rib which connects distal end portions of the pair of reinforcing projections to each other is formed on the groove bottom of the main groove, wherein the pair of reinforcing projections is formed in a projecting manner such that the pair of reinforcing projections is inclined in directions that the reinforcing projections approach to each other toward the inside of the main groove from the side walls.

8. The pneumatic tire according to claim 7, wherein each reinforcing projection includes an inclined surface portion where a projection height of the reinforcing projection from the groove bottom is decreased as the reinforcing projection extends toward a distal end portion side.

9. The pneumatic tire according to claim 8, wherein each reinforcing projection includes a terrace portion between the side wall and the inclined surface portion.

10. The pneumatic tire according to claim 8, wherein the projecting height of each reinforcing projection from the groove bottom is from 35% to 65% of a depth of the main groove, and a projection width of each reinforcing projection from the side wall is from 35% to 65% of a groove width of the main groove.

11. The pneumatic tire according to claim 10, wherein the connecting rib has a width within a range not exceeding 50% of the projection width of the reinforcing projections.

12. The pneumatic tire according to claim 7, wherein the block on which the reinforcing projections are provided is a shoulder block.

13. A pneumatic tire comprising: a tread portion which includes blocks formed by a main groove extending in a tire circumferential direction and a lateral groove extending in a direction which intersects with the main groove, wherein
at least one block includes at least two sipes which divide the block into three or more sections in the tire circumferential direction,
a pair of reinforcing projections which projects in the main groove is formed on both end portions of the block in the tire circumferential direction ranging from a side wall of the block to a groove bottom of the main groove, and
a connecting rib which connects distal end portions of the pair of reinforcing projections to each other is formed on the groove bottom of the main groove,
wherein each reinforcing projection includes an inclined surface portion where a projection height of the reinforcing projection from the groove bottom is decreased as the reinforcing projection extends toward a distal end portion side,
wherein the projecting height of each reinforcing projection from the groove bottom is from 35% to 65% of a depth of the main groove, and a projection width of each reinforcing projection from the side wall is from 35% to 65% of a groove width of the main groove, and
wherein a height of the connecting rib from the groove bottom is from 2% to 20% of the depth of the main groove, and is set to the same height as a lower end of the inclined surface portion.

14. The pneumatic tire according to claim 13, wherein each reinforcing projection includes a terrace portion between the side wall and the inclined surface portion.

15. The pneumatic tire according to claim 13, wherein the connecting rib has a width within a range not exceeding 50% of the projection width of the reinforcing projections.

16. The pneumatic tire according to claim 13, wherein the block on which the reinforcing projections are provided is a shoulder block.

\* \* \* \* \*